United States Patent [19]

Renner et al.

[11] Patent Number: 5,241,058

[45] Date of Patent: Aug. 31, 1993

[54] AZO DYE SALTS USEFUL AS MASKING COUPLERS AND PREPARATION THEREOF

[75] Inventors: Günter Renner, Bergisch Gladbach; Hans Langen, Bonn; Ulrich Klein, Leverkusen, all of Fed. Rep. of Germany

[73] Assignee: Agfa-Gevaert Aktiengesellschaft, Leverkusen, Fed. Rep. of Germany

[21] Appl. No.: 700,561

[22] Filed: May 15, 1991

[30] Foreign Application Priority Data

May 29, 1990 [DE] Fed. Rep. of Germany ....... 4017245

[51] Int. Cl.⁵ .................. C09B 29/50; C09B 41/00; G03C 7/30
[52] U.S. Cl. .................. 534/728; 534/573; 534/581; 534/651; 534/781; 534/786; 534/887
[58] Field of Search ............... 534/581, 728, 781, 786

[56] References Cited

U.S. PATENT DOCUMENTS

| | | | |
|---|---|---|---|
| 3,576,635 | 4/1971 | Sakamoto et al. | 430/555 |
| 3,677,764 | 7/1972 | Glockner et al. | 430/546 X |
| 3,993,638 | 6/1975 | Fleckenstein | 534/728 X |
| 4,004,929 | 1/1977 | Orvis | 534/728 X |
| 5,075,207 | 12/1991 | Langen et al. | 430/553 X |

FOREIGN PATENT DOCUMENTS 1770014 4/1972 Fed. Rep. of Germany.
3815469 11/1989 Fed. Rep. of Germany.

OTHER PUBLICATIONS

Saunders, "The Aromatic Diazo Compounds and Their Technical Applications", 2nd ed., Edward Arnold & Co., London, 1949, pp. 18-20.

Primary Examiner—Mary C. Lee
Assistant Examiner—Fiona T. Powers
Attorney, Agent, or Firm—Connolly & Hutz

[57] ABSTRACT

Azo dye salts corresponding to formula I are suitable as masking couplers.

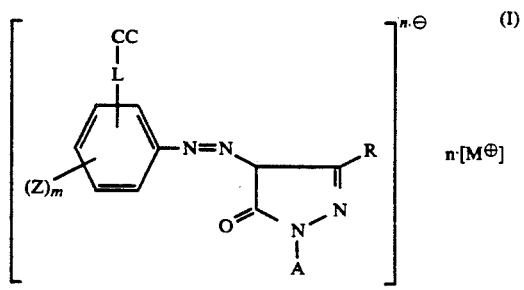

In Formula I,

A denotes an optionally substituted aryl group;
CC denotes a group optionally carrying a ballast group and capable of coupling under the conditions of photographic color development to produce a dye preferably a cyan dye (color coupler residue);
L denotes a linking member which is attached at the coupling position of the color coupler residue by an oxygen, sulphur or nitrogen atom;
Z denotes a group conferring solubility in alkalies;
R denotes $NH-CO-R^1$, $NH-SO_2-R^1$, $COOR^2$ or $NR^1-R^2$;
$R^1$ denotes an optionally substituted alkyl or aryl group;
$R^2$ denotes H or a group such as $R^1$;
[M⊕] denotes a mixture of organic and inorganic cations optionally containing protons, in which the proportion of organic cation amounts to at least ½ mol per mol of dye;
m stands for 0, 1 or 2; and
n stands for 1, 2, 3 or 4; n≧m.

4 Claims, No Drawings

AZO DYE SALTS USEFUL AS MASKING COUPLERS AND PREPARATION THEREOF

This invention relates to novel azo dye salts and to a process for their preparation. Azo dyes are normally produced by the diazotisation of an amine and reaction of the diazotised product with a coupling component.

Azo dyes in which the chromophore corresponds to formula I shown below and their preparation are described in DE-A-38 15 469. In the method described there, diazotisation is carried out in an aqueous/alcoholic solution with the addition of concentrated hydrochloric acid and coupling is carried out in an alkaline medium with the addition of sodium hydroxide solution or sodium methanolate. It has been shown that this process is disadvantageous in the following respects:

a) The dye is not precipitated in a crystalline but in an amorphous form, which leads to inclusions.
b) The use of strong bases to dissolve the coupling component leads to heavily contaminated end products due to partial hydrolysis, inter alia dyes which have no basic coupler structure and which are diffusible and hence interfere with the photographic process.
c) The quantity of acid determines the cation/proton ratio in the end product; mixed salts are produced owing to the similar $pk_a$ values.
d) The process results in salts which are deleterious to photographic layers (friability).
e) The mixtures of coupling product and salt obtained in this process are very difficult to free from their hydrophobic impurities since the compounds stick after they have been stirred up in hydrophobic solvent so that the solvent used for cleaning is extremely difficult and sometimes impossible to remove.
f) The salt of alkali metal and dye obtained can only with difficulty be introduced into photographic materials, either at a pH > 12 or highly diluted with water or in an aqueous/organic solvent with very large quantities of wetting agents. All three methods mentioned are unsatisfactory for photographic materials and lead to disadvantages for the photographic layers.

The synthesis of masking couplers on the Agfa color principle, i.e. with hydrophilic groups, has also been described, for example in DE-A-1 770 014 and DE-A-1 797 083, in which diazotisation is carried out in an aqueous hydrochloric acid solution, and the product is coupled in pyridine/water and precipitated with acid.

Such a process cannot be applied to hydrophobic amines since the compounds crystallise as hydrochlorides, and acid precipitation is also undesirable, as described above.

The diazotisation of a hydrophobic amine is described in DE-A-25 09 408. Glacial acetic acid and concentrated hydrochloric acid are used to dissolve the amine and diazotisation is carried out with an aqueous nitrite solution. This process also leads to precipitation of amine hydrochlorides and to the formation of by-products due to the action of the concentrated acids and due to the reaction of nitrite solution with precipitated hydrochloride (inclusions).

The invention is based on the object of providing new azo dyes optionally carrying a color coupler residue, which dyes are distinguished in that the diazotisation and coupling process is easy to handle, in that high yields and a high degree of purity are obtained, in particular a low alkali metal cation content (salt content), and the dyes are also distinguished by good solubility.

A method has been found which enables hydrophilic, diffusion-resistant azo dyes in the form of the dye salts corresponding to formula I shown below to be readily and easily produced in high yields and with great purity and excellent photographic properties (excellent suitability for use in photographic materials).

The invention relates to azo dye salts corresponding to formula (I)

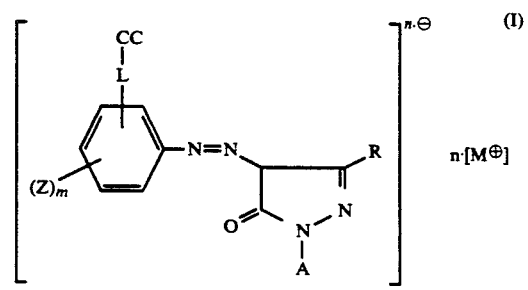

wherein

A denotes an optionally substituted alkyl group or an optionally substituted aryl group;

CC denotes a group optionally carrying a ballast group and capable of coupling under the conditions of photographic color development to produce a dye, preferably a cyan dye (color coupler residue);

L denotes a linking member attached at the coupling position of the color coupler residue by an oxygen, sulphur or nitrogen atom;

Z denotes a group conferring solubility in alkalies;

R denotes $NH-CO-R^1$, $NH-SO_2-R^1$, $COOR^2$ or $NR^1-R^2$;

$R^1$ denotes an optionally substituted alkyl or aryl group;

$R^2$ denotes H or a group such as $R^1$; $R^1$ and $R^2$ optionally form a ring together with the N atom to which they are attached, e.g. a pyrrolidine ring;

[M+] denote a mixture of organic and inorganic cations optionally containing protons, in which the proportion of organic cations amounts to at least ½ mol per mol of dye;

m stands for 0, 1 or 2;

n stands for 1, 2, 3 or 4; n ≧ m.

An alkyl group denoted by A may contain, for example, 1-8 carbon atoms and may be substituted, for example with OH, $OCH_3$, acylamino or carboxyl. An aryl group denoted by A may be, for example, a phenyl or naphthyl group which may be substituted, e.g. with Cl, alkyl, alkoxy, alkylthio, phenoxy, acylamino, carboxyl or sulpho.

A linking member denoted by L contains one or more of the following groups, optionally alternating with alkylene or arylene groups;

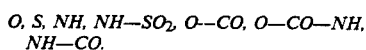

An alkali solubilizing group denoted by Z may in particular be a sulpho group or a carboxyl group. Such groups may be present up to twice on the benzene ring of formula I; independently thereof, an aryl group denoted by A (formula I) may also contain one or two alkali solubilizing groups Z.

The cation mixture denoted by [M⊕] contains inorganic and organic cations and optionally protons in the quantity required for neutralization. Conventional inorganic cations are those of alkali metal and alkaline earth metals such as lithium, sodium, potassium, magnesium and calcium. The ammonium cation should also be mentioned here. The organic cations are derived from organic nitrogen bases.

Suitable organic nitrogen bases are in particular hererocyclic bases, preferably 5- or 6-membered rings containing 1-3 nitrogen atoms, such as pyridine and alkyl-substituted pyridine, quinoline, piperidine, pyrrolidine, morpholine, pyrazole and imidazole; diazabicyclo-[2,2,2,]-octane (DABCO), diazabicyclo[4,4,0]non-5-ene (DBN) or diaza-bicyclo[5,4,0]undec-7-ene (DBN); but also non-cyclic amines such as, for example, triethylamine, tetramethylguanidine and triethanolamine.

In preferred azo dye salts according to the present invention, L-CC stands for one of the following groups:

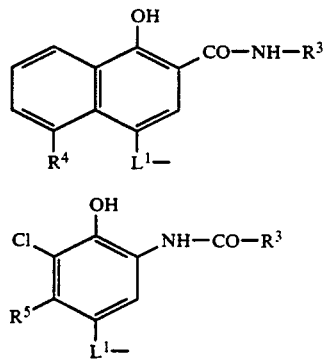

wherein $L^1$ denotes O, NH, S, O—CH$_2$—CH$_2$—O or O—CH$_2$—CO—O;

$R^3$ denotes alkyl or aryl, preferably substituted, so that $R^3$ assumes a ballast function;

$R^4$ denotes H, —NH—CO—(O)$_n$—R$^8$ or NH—SO$_2$—R$^8$;

$R^5$ denotes alkyl, preferably having 2-4 carbon atoms;

$R^6$ denotes a group such as $R^3$ or NH-aryl;

$R^8$ denotes alkyl or aryl, and n stands for 0 or 1.

By "ballast function" is meant a function which renders the azo dye salt of formula I diffusion-fast as a whole in the layers of photographic material or contributes to the diffusion resistance. A ballastized group denoted by $R^3$ may be, for example, an alkyl-substituted or alkoxy-substituted phenyl group having at least 12 carbon atoms or an alkyl group substituted with an alkyl-substituted phenoxy group having at least 12 carbon atoms. A ballast group denoted by $R^6$ preferably has the following structure:

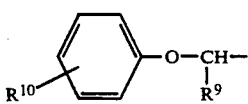

wherein $R^9$ denotes H or alkyl which may be straight chained or branched and has up to 16 carbon atoms;

$R^{10}$ denotes one or more substituents such as halogen, OH, alkyl, alkoxy, alkylthio or alkylsulphonyl.

Examples of azo dye salts according to the invention corresponding to formula I are shown below. Only the anionic part (chromophore) is shown in each case. The cationic part consists of sodium and pyridinium cations unless otherwise indicated, at least ½ mol of pyridinium ions or ions of another organic base being present per mol of dye. The dyes thus correspond to the following formulae according to the coupling components used for their preparation:

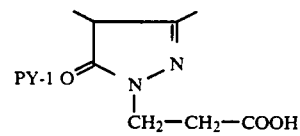

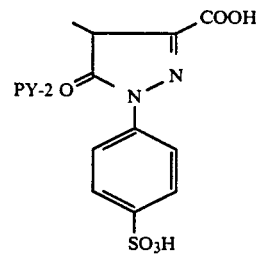

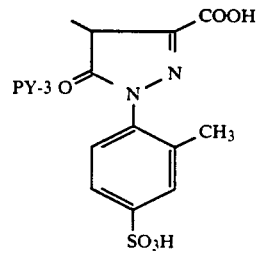

-continued
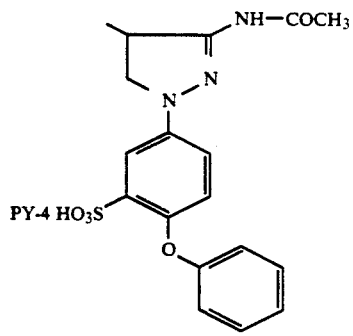
PY-4
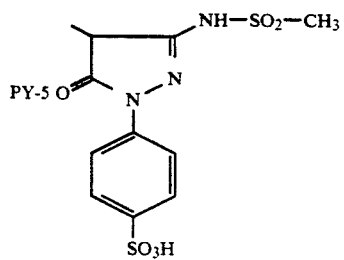
PY-5
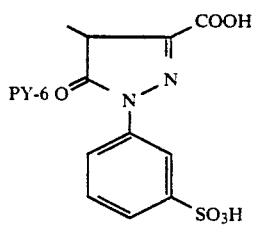
PY-6
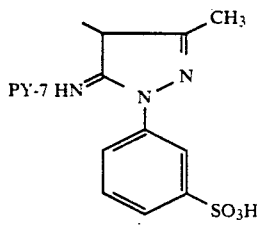
PY-7
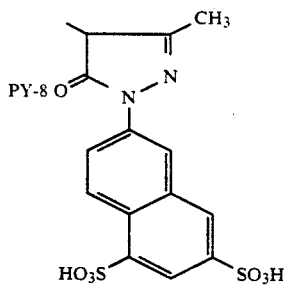
PY-8
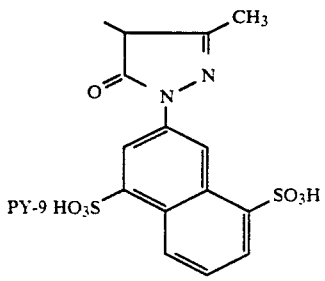
PY-9

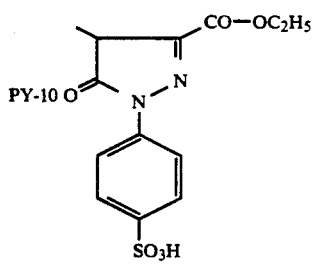
Azo dyes:
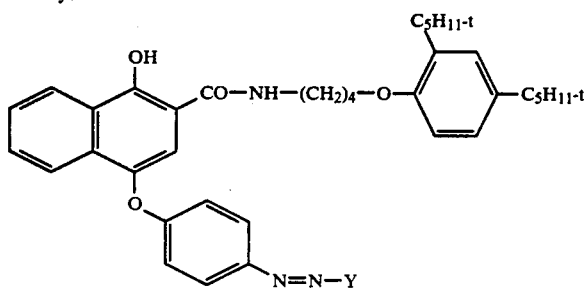
1 Y = PY-1
2 Y = PY-2
2b Pyrazole salt
2c Piperidine salt
3 Y = PY-3
(in the form of the 2,4-dimethylpyridine salt)
4 Y = PY-4
4b Picoline salt
5 Y = PY-5
6 Y = PY-6
6b Lutidine salt
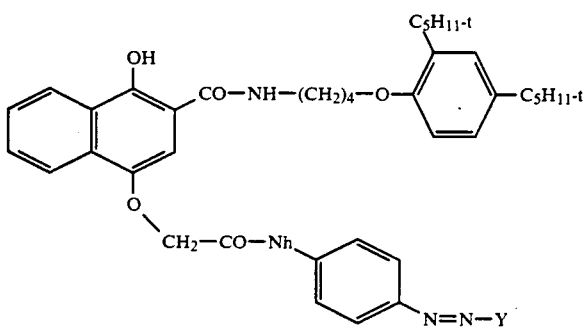
7 Y = PY-7
8 Y = PY-8
9 Y = PY-9
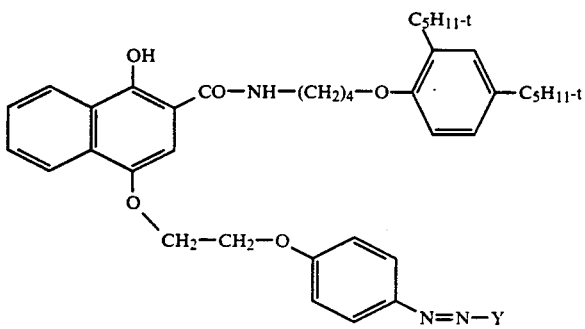
10 Y = PY-10
11 Y = PY-3

-continued
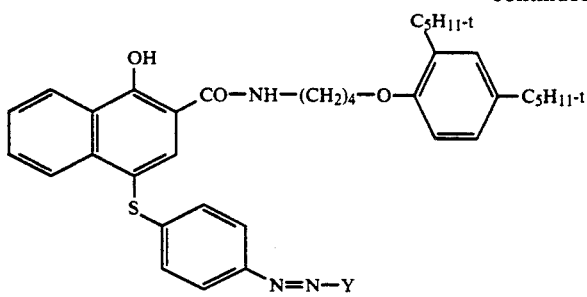
12 Y = PY-2
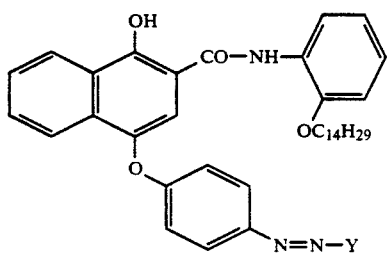
13 Y = PY-2
13b Pyrazole salt
13c Lutidine salt
13d Tetramethylguanidine salt
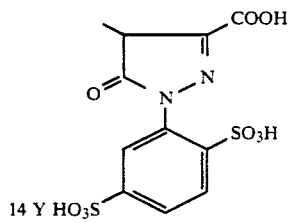
14 Y HO₃S
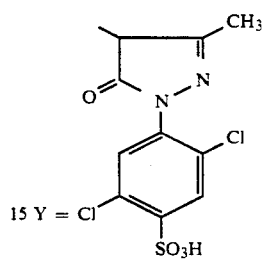
15 Y = Cl
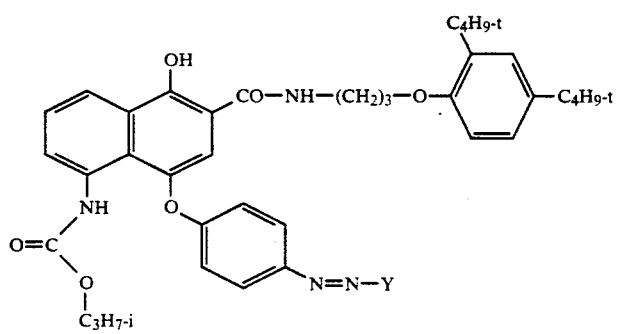
16 Y = PY-2
17 Y = PY-6
18 Y = PY-1

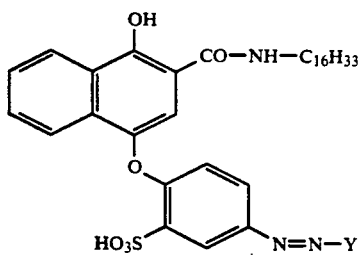

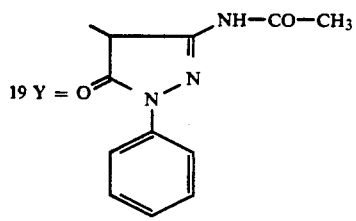
19 Y =

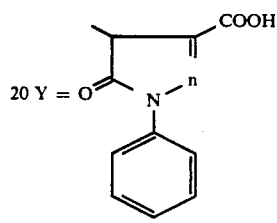
20 Y =

21 Y = PY-2

In a preferred embodiment of the present invention an a dye salt corresponds to the following formula:

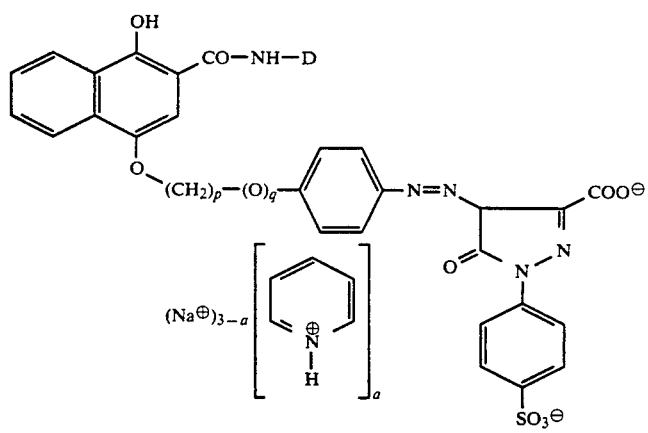
(V)

Py-2 wherein
D denote aryl or aryloxyalkyl,
p stands for 0, 1, 2, 3 or 4,
q stands for 0 or 1; q=0 when p=0; and $0.5 \leq a \leq 3$.

Preparation of the azo dye salts according to the invention corresponding to formula I may be carried out by, for example, diazotisation of an amino compound corresponding to formula V,

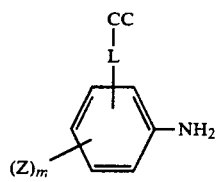

wherein CC, L, Z and m have the meanings already indicated, and coupling of the diazotisation product on a coupling component corresponding to formula VI

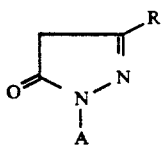 (VI)

wherein A and R have the meanings already indicated, the diazotisation being carried out in a mixture of an alcohol having 1–5 carbon atoms and an aliphatic carboxylic acid having 2–6 carbon atoms as solvent, optionally in the presence of water, and/or HCl, and coupling being carried out by addition of the solution of the diazotisation product to a solution of the coupling component in a mixture of alcohol having 1–5 carbon atoms, water and an organic base as solvent. The organic base used provides the organic component of the cation mixture present in the azo dye salts according to the invention.

The alcohol used as solvent for the diazotisation and-/or for the coupling reaction may be, for example, methanol, ethanol, propanol, isopropanol or n-butanol. Particularly suitable aliphatic carboxylic acids used as solvent component for the diazotisation are formic acid, acetic acid and propionic acid.

The process of synthesis described is distinguished by the fact that diazotisation is carried out in a mixture of alcohol and carboxylic acid, optionally in the presence of HCl or hydrochloric acid, and coupling is carried out in a suitable mixture of alcohol, water and a nitrogen base.

The coupling reaction is carried out in such a manner that the coupling product slowly begins to crystallise after all the diazonium salt solution has been added and this crystallisation is completed within a period of from 1–5 hours.

Diazotisation is generally carried out by dissolving the amine (V) with alcohol, e.g. methanol, carboxylic acid, e.g. glacial acetic acid, and concentrated hydrochloric acid, in the presence of little or no water and reacting the resulting solution with a concentrated aqueous solution of sodium nitrite or with amyl nitrite or nitrosyl sulphuric acid. Larger quantities of water are added to the solution mixture if the amines have undergone less ballastisation.

In both cases, the quantity of solvent and the composition should be so chosen that diazotisation takes place in solution although sodium chloride or sodium carboxylate may precipitate and should then no longer be present in the coupling reaction.

Similar proportions of solvents should be used for the coupling reaction; the coupling component, which may be hydrophilic, is dissolved in a solvent mixture containing a major proportion of methanol and smaller quantities of water and organic base. Sulphonated pyrazolone, for example, may well be dissolved in 20 times their quantity of solvent composed of methanol:water:-pyridine=4:2:1. Coupling components which are more hydrophobic are brought into solution with smaller quantities of water.

It has now surprisingly been found that the yield and quality of the dye to be produced depends largely on the total solvent composition (of diazotisation+coupling) of the coupling reaction: The final pH of the coupling reaction should be in the weakly acid region, i.e. pH 4 to 6. This means that the quantity of acid(s) and nitrogen base is of a similar order of magnitude. This leads to a considerable amount of salt formation, which in turn necessitates the use of such large quantities of water in the reaction mixture that complete crystallisation does not occur. This binding of water by the salt formed has the desired effect that the hydrophilic and ballastised masking coupler crystallises from the reaction solution. The dyes which crystallise are uniform in their chemical composition and are in most cases composed of the dye acid anion and cations, in most cases differing cations. When sodium nitrite is used for diazotisation, $Na^{\oplus}$ cations are frequently found side by side with cations formed from the protonised nitrogen base, e.g. pyridinium cations. In addition, the dyes crystallise with varying quantities of water of crystallisation firmly built into the dyes. It has also surprisingly been found that the dyes obtained under the above mentioned diazotisation and coupling conditions are exceptionally pure, especially due to the avoidance of strongly alkaline media. In particular, the formation of coupling by-products and the formation of decomposition products of dyes, which seriously interfere with photographic processes, is avoided.

Diazotisation is preferably carried out at temperatures from 0° to 10° C. and the optimum temperature for the coupling reaction is from 15° to 30° C.

EXAMPLES

1. Preparation of Compound 2 (Variation A)

58.2 g of 1-hydroxy-4-p-aminophenoxy-N-[γ-(2,4-di-t-pentylphenoxy-butyl]-2-naphthamide are dissolved in
250 ml of methanol and
175 ml of glacial acetic acid, and
40 ml of 30% hydrochloric acid are added. A solution of
20.5 sodium nitrite in
30 ml of water is added at 5°–8° C. The nitrite excess is destroyed with amidosulphonic acid after 1 hour. The solution obtained is then added at
25° C. to a solution of
45 g of 1-(4-sulphophenyl)-pyrazolone-3-carboxylic acid (70%) in
380 ml of water,
760 ml of methanol and
200 ml of pyridine.

The crystallised dye is suction filtered after 4 hours, washed with a methanol/water mixture, dried and purified with acetonitrile or cleaning petrol or benzene. Yield: 86.3 g (88% of theoretical yield).

A monosodium dye salt containing 2 mol of water of crystallisation and pyridine bound in the form of a salt is obtained.

Preparation of Compound 2 (Variation B)

The procedure is the same as for Variation A except that a different solvent composition is used for diazotisation. 200 ml of methanol, 190 ml of propionic acid and 45 ml of 25% hydrochloric acid are used, the other components of the reaction mixture remaining the same.

The dye yields are approximately identical to the yields of Variation A.

Preparation of Compound 2 (Variation C)

The procedure is the same as for Variation A except that coupling is carried out in 350 ml of water, 700 ml of methanol and 250 ml of quinoline.

The dye yields are identical to the yield of Variation A.

2. Preparation of Compound 3

Diazotisation is carried out as described for Compound 2. This solution is added at 20°–25° C. to a solution of 30 g of 1-(2-methyl-4-sulpho)phenyl-pyrazolone-3-carboxylic acid in 400 ml of water, 700 ml of methanol and 220 ml of 2,4-dimethyl-pyridine.

78 g of the dye (yield 79% of theoretical yield) are obtained after crystallisation, washing, drying and purification with acetonitrile.

The dye contains about 5.5% of lutidine and 4% of water.

3. Preparation of Compound 4

Diazotisation is carried out as described for Compound 2. The diazonium salt solution obtained is added at 15°20° C. to a solution of 42 g of 5-(3-acetyl-aminopyrazolon-1-yl)-2-phenoxybenzene sulphonic acid in 300 ml of water, 700 ml of methanol and 90 ml of 4-methylpyridine (4-picoline). The reaction mixture is stirred until it is at room temperature. The dye slowly crystallises. It is suction filtered after 5 hours. 88.5 g (82% of theoretical) of dye containing 2.5 mol of water of crystallisation and 4.6% of picoline are obtained.

4. Preparation of compound 13 a) 30.6 g of 4-(p-nitrophenoxy)-1-hydroxy-2(o-tet-radecyloxy)-carbonamide are dissolved in 250 ml of methanol and 10 ml of 30% sodium methylate in methanol. The solution is hydrogenated with Raney nickel. When freed from nickel, the solution is acidified with 90 ml of glacial acetic acid, and 25 ml of concentrated hydrochloric acid are added. Diazotisation is carried out with an aqueous solution of 8.6 g of sodium nitrite. The diazonium salt solution thus obtained is slowly added to a solution of 15.5 g of 1-(4-sulpho-phenyl)-pyrazolone-3-carboxylic acid in 200 ml of water, 400 ml of methanol and 100 ml of pyridine. The reaction mixture is then stirred for 5 minutes, suction filtered and washed with methanol/water. The dried product is stirred into light petrol and suction filtered. 41 g of dye, amounting to ≧84% of the theoretical yield, containing 4.3% of pyridilne, 2.6% of Na and 2 mol of water of crystallisation, are obtained.

b) Method a) is repeated but with the addition of 75 g of pyrazole instead of 100 ml of pyridine to the solution of the coupling component. The product is worked up in analogous manner and 38 g of dye containing 3.8% of pyrazole, 2.6% of Na and 2.5 mol of water of crystallisation are obtained.

5. Comparison Example (not according to the invention)

Synthesis of Compound 2

58.2 g of 1-Hydroxy-4-p-aminophenoxy-N-[γ(-2,4-di-t-pentylphenoxy)-butyl]-2-naphthamide are dissolved in 600 ml of methanol with 60 ml of concentrated hydrochloric acid. The solution is cooled to 5° C. and 17.2 g of sodium nitrite in 45 ml of water are added at constant temperature. The reaction mixture is then stirred and the excess nitrite is mixed with amidosulphonic acid. The diazonium salt solution is added within 30 minutes to a solution of 31.5 g of 1-(4-sulphophenyl)pyrazolone-3-carboxylic acid in 150 ml of water, 700 ml of methanol and 125 g of 45% sodium hydroxide solution. The reaction temperature is maintained at 15° C. The reaction mixture is then stirred for 1 hour without cooling and carefully acidified with about 135 ml of 50% acetic acid until a pH of 6.4 is obtained. The dye then precipitates. The precipitate is filtered through a filter cloth and washed with ice water/methanol. The dye is dried and stirred up several times with 500 ml portions of cleaning petrol to remove the hydrophobic impurities. 67 g of dye with 2 mol of Na are obtained.

Compared with the azo dye salts according to the invention, the dye prepared by the above process is a) obtained in a smaller yield and as a noncrystallising, amorphous product, b) obtained in a less pure form, which may be attributed to the failure to crystallise (evidence by DC and HPLC analyses)

c) obtained as crude product containing a substantially larger quantity of by-products, in particular of a hydrophobic nature, formed by splitting off of the colored hydrophilic fugitive group, and obtained with a higher salt content (evidence by JCPAES analysis).

In addition, when the synthesis is carried out in practice, it is found that the process is much more difficult owing to the considerable problems entailed in suction filtration of the dye (amorphous form which is difficult to separate by suction filtration, agglomeration and sticking).

The major disadvantage of synthesizing with sodium hydroxide instead of by the process according to the invention described lies, however, in the greater difficultly of using the dye for photographic purposes. The dye produced by the process according to the invention is much more readily soluble in aqueous gelatine solution, as is illustrated by the following Example of application.

6. Examples of application a) 10 g of azo dye prepared by azo coupling in the presence of pyridine by the process according to the invention were stirred into 450 ml of a 3.3% gelatine solution at 55° C., at first using a slowly rotating paddle stirrer and then briefly with a mixing siren. A clear gel was obtained which solidified at 6° C. and when cast formed a completely homogeneous and transparent layer.

b) The process described in Example 6a) is repeated with conventionally prepared azo dye. Although the dye coupler was ground down in a mortar before the experiment, the dye coupler did not go into solution. A dispersion which reflected an orange color was obtained, which was difficult to recouple, and the photographic material obtained after casting had many faults in the form of spots and was inhomogeneous.

c) 10 g of conventionally prepared azo dye were dissolved together with 1 g of sodium dodecylbenzene sulphonate in 40 ml of ethyl acetate with the addition of 10 ml of water at 55° C. and emulsified, after filtration, in 450 ml of a 3.3% gelatine solution, using a high speed mixing siren. The ethyl acetate was then removed in a vacuum and the resulting gel was left to solidify at 6° C. Although the gel prepared by this method can be used photographically, it requires a difficult process of preparation.

d) 10 g of conventionally prepared azo dye together with 1 g of sodium dodecylbenzene sulphonate were added to 30 ml of 1N NaOH. Water was then added at 60° C. to make up the volume to 500 ml and the pH was adjusted to 12.2. A solution was obtained from which crystals began to separate after about 24 hours. Although the solution can be used within 24 hours, it has the disadvantage that when used as photographic addition to a layer it gives rise to high fogging values owing to the high pH.

It is clear from the Examples of application that the azo dye salts according to the invention containing pyridinium cations have distinct advantages and that the azo dye prepared by conventional methods cannot be used problem free in spite of the complicated methods of introduction as described in Examples 6b) to 6d).

We claim:

1. An azo dye salt corresponding to formula I

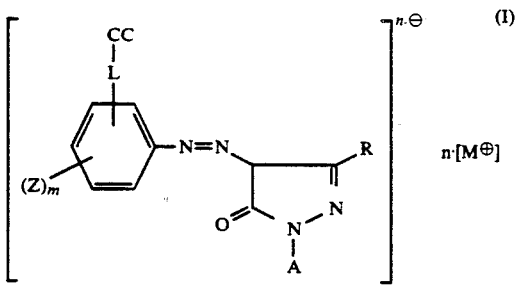

wherein

A denotes an optionally substituted alkyl group or an optionally substituted aryl group;

CC denotes a group optionally carrying a ballast group and capable of coupling under the conditions of photographic color development to form a cyan dye (cyan dye-forming coupler residue);

L denotes a linking member which is attached at the coupling position of the cyan dye-forming coupler residue by an oxygen, sulphur or nitrogen atom;

Z denotes an alkali solubilizing group;

R denotes $NH-CO-R^1$, $NH-SO_2-R^1$, $COOR^2$ or $NR^1-R^2$;

$R^1$ denotes an alkyl or aryl group;

$R^2$ denotes H or a group such as $R^1$;

[$M^+$] denotes a mixture of organic and inorganic cations optionally containing protons, in which the proportion of organic cations amounts to at least $\frac{1}{2}$ mol per mol of dye;

m stands for 0, 1 or 2;

n stands for 1, 2, 3 or 4; $n \geq m$.

2. A azo dye salt according to claim 1, characterized in that the organic cations contained in the cation mixture are derived from a heterocyclic base having a 5-membered or 6-membered heterocyclic ring containing 1–3 nitrogen atoms.

3. A azo dye salt according to claim 2, characterized in that the heterocyclic base is pyridine.

4. A azo dye salt according to claim 3, corresponding to the following formula:

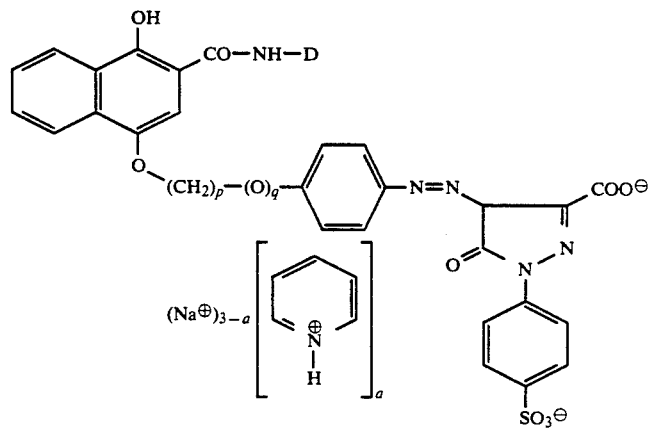

wherein

D denotes aryl or aryloxyalkyl, p stands for 0, 1, 2, 3 or 4, q stands for 0 or 1; q=0 when p=0 and $0.5 \leq a \leq 3$.

* * * * *